United States Patent [19]

Hornung et al.

[11] Patent Number: 4,540,318
[45] Date of Patent: Sep. 10, 1985

[54] ROTARY ELECTRICAL TOOL WITH SPEED CONTROL, ESPECIALLY DRILL

[75] Inventors: Friedrich Hornung, Stuttgart; Fritz Schädlich, Leinfelden-Echterdingen, both of Fed. Rep. of Germany

[73] Assignee: Robert Bosch, GmbH, Stuttgart, Fed. Rep. of Germany

[21] Appl. No.: 497,506

[22] Filed: May 24, 1983

[30] Foreign Application Priority Data

Jul. 29, 1982 [DE] Fed. Rep. of Germany ....... 3228304
Jul. 29, 1982 [DE] Fed. Rep. of Germany ....... 3228303

[51] Int. Cl.$^3$ .............................................. B23B 45/02
[52] U.S. Cl. ........................................... 408/9; 408/8; 279/1 H; 318/17
[58] Field of Search ...................... 279/1 H, 9 R, 110; 408/8, 9, 238 R, 239 R, 241 R, 240 R; 318/17, 309

[56] References Cited

U.S. PATENT DOCUMENTS

| 3,143,900 | 8/1964 | Oeckl et al. | 408/8 |
| 4,292,571 | 9/1981 | Cuneo | 408/9 |
| 4,443,137 | 4/1984 | Albrent et al. | 408/9 |

FOREIGN PATENT DOCUMENTS

| 57-205012 | 12/1982 | Japan | 408/16 |
| 7807412-7 | 5/1980 | Sweden . | |

Primary Examiner—Gil Weidenfeld
Assistant Examiner—Daniel W. Howell
Attorney, Agent, or Firm—Frishauf, Holtz, Goodman & Woodward

[57] ABSTRACT

To provide for, selectively, control of the speed of a tool, such as a drill or boring tool coupled to an electric drill or boring machine motor, independently of the setting of a multi-speed transmission, speed of the tool is sensed by a contactless transducer (4, 7), one part of which is coupled to the chuck (1, 2) and the other to the housing (H) of the tool, to provide speed signals which incorporate the transmission ratio of the gear (G, 66). Speed control, for example under a command signal (40; 50), then will control the actual speed, regardless of the transmission setting, with the torque deliverable by the motor being controlled by the selected gear. The diameter of the drill or other tool bit is sensed also by the transducer, if coupled to the chuck jaws, to vary the output signal from the transducer as a function of chuck jaw diameter. The output signal can be selectively analyzed for frequency in a frequency evaluation stage (35), and for amplitude in an amplitude evaluation stage (34), the speed and chuck jaw spacing signals can be separated (FIG. 8) from a combined speed - chuck jaw spacing signal obtained, to provide for control of the motor as a function of material being worked on (40; A–D), of accessories (40) to associate output speed with materials and drill diameter in accordance with selected functions, or only of speed, for example for operating accessories such as screwdrivers, sanding disks, or the like.

37 Claims, 11 Drawing Figures

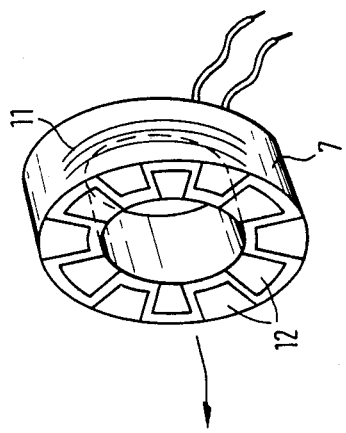
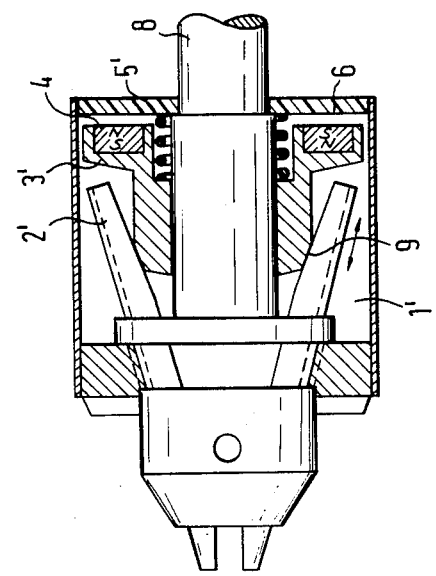
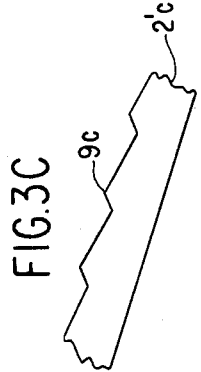

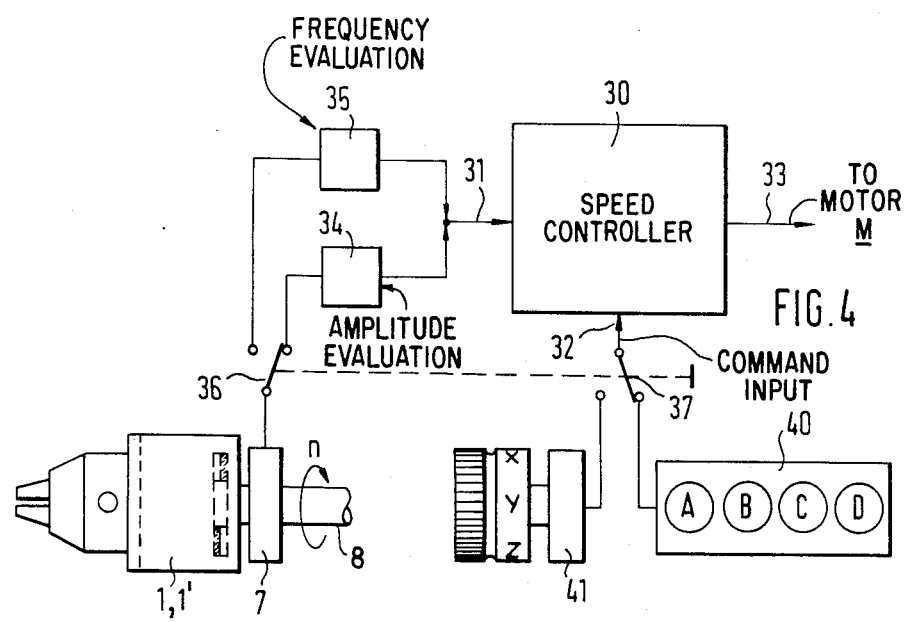
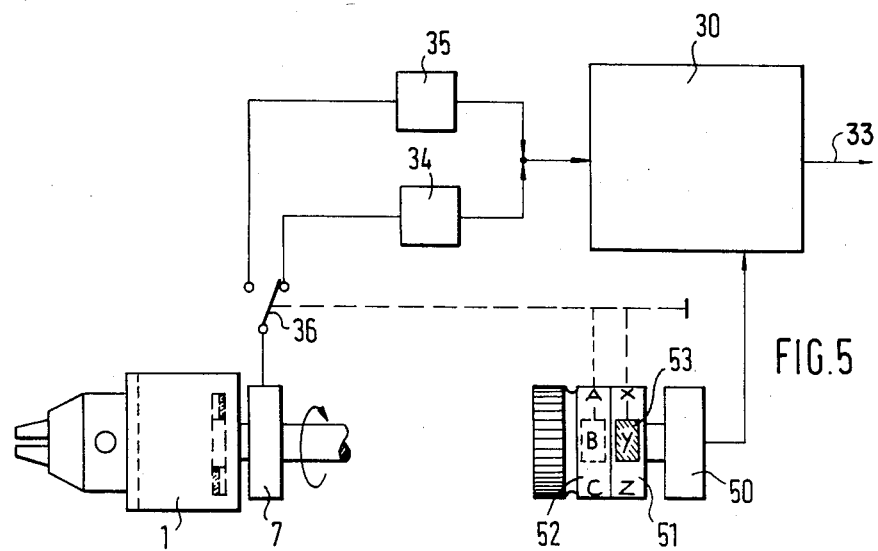

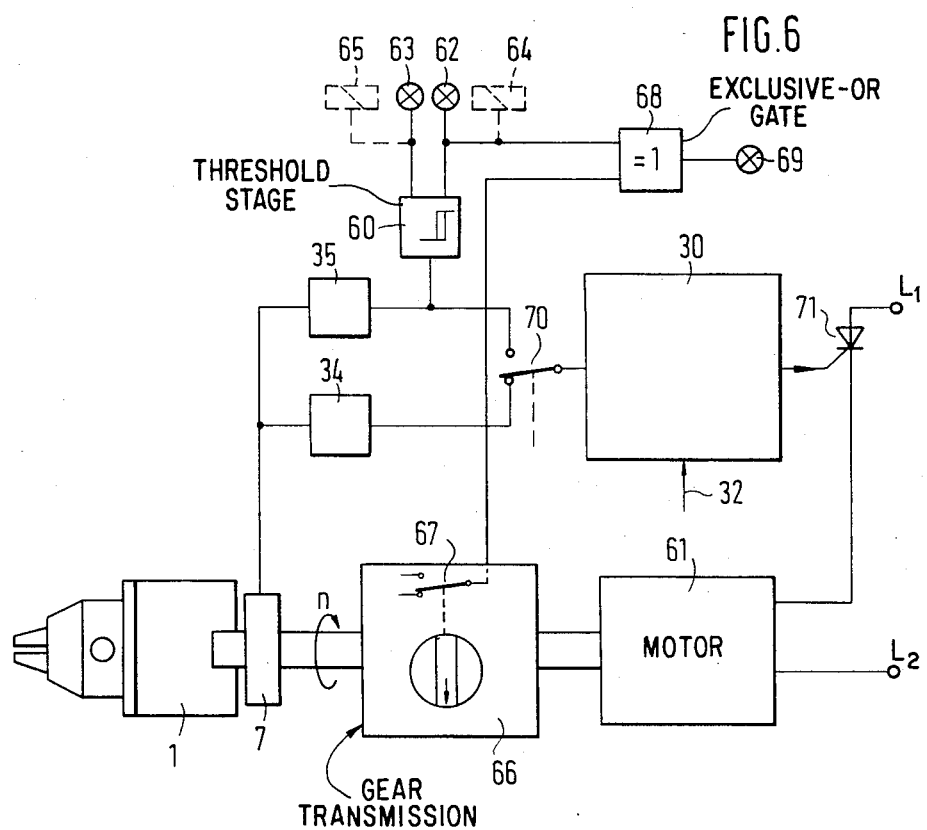

4,540,318

ROTARY ELECTRICAL TOOL WITH SPEED CONTROL, ESPECIALLY DRILL

REFERENCE TO RELATED PUBLICATION

Swedish Patent Disclosure Document SE-OS No. 78 07 412-7.

The present invention relates to rotary, electrically driven tools, and more particularly to drills, boring machines, and the like, for example of the hand-held type, or of the machine tool type, which include speed control circuitry.

BACKGROUND

Rotary tools of the drill or boring tool type usually use chucks to hold drill bits or boring tool bits. Many types of such tools—hereinafter for short "drills"—permit adjustment of the operating speed of a drive motor within wide limits without changing gearing in the motor. The speed which is to be selected at which a drill bit or boring bit is to operate depends on the diameter of the hole to be made or reamed, the material in which the hole is being made, and the quality of the drill or boring bit. Other types of such machine tools have internal gearing, which can be selected as desired, to provide higher torque, or higher speeds, respectively, at the tool bit with a given speed of the drive motor.

The speed of operation of the tool bit is usually determined either by experience by the operator, or taken from a table. Frequently, it is merely estimated. Tables which are available for preferred speeds, considering the diameter of the hole to be worked, the materials and the particular tool bits, are often ignored, particularly if there is time pressure on the operator. Estimating the speed within the wide operating range which electrical drills are capable of is frequently coupled with uncertainty. Less than highly skilled or experienced operators often operate drill bits, boring bits and the like at improper speeds. The result is that, either, the tool bit is damaged by too fast rotation or feed, so that it will heat excessively and may even become incandescent; or the speed of operation as well as the resulting hole may be improperly made.

The referenced Swedish Patent Disclosure Document SE-OS No. 78 07 412-7 describes control systems in electric boring machines in which the motor speed is controlled as a function of the tool bit diameter secured in the chuck of a drill or boring machine. As described, transmission of the data representing diameter of the drill bit to the control system is carried out mechanically. The actual construction is complex to build, and it is difficult to obtain a suitable transmission path from the rotating chuck to the control system which is fixedly secured to the housing or frame or structure of the boring machine. The signals which are derived are not dependent on speed, only on diameter of the tool bit. The control system, thus, is controlled only in relation to the diameter of the tool bit. Matching the speed of the operation of the tool bit to different materials which are to be drilled or bored is not possible in the system as described.

Other types of speed control systems are known, in which the speed of rotation of the tool bit is controlled, the speed itself being derived from the rotary speed of the motor itself. The controller then determines the operating speed of the drive motor. If the drill is a multi-geared drill, then the speed of the tool bit itself additionally depends on the transmission ratio of the interposed gearing. Thus, the control of the speed of operation of the tool bit can be adjusted in two ways: by controlling the speed of the motor, and by setting the transmission ratio of the drive transmission. It is, thus, possible to obtain a single speed of the tool bit in two different ways. The possibility of obtaining this single speed in two ways further increases the difficulty in finding the proper speed for the tool bit and also interferes with easy readability of speed tables which relate tool bit speeds to different materials. For example, a higher drive torque is obtainable by selecting a certain transmission ratio; this, then, requires readjustment of the speed controller in order to obtain the same drive speed which may have been selected previously at a different transmission ratio. This is particularly annoying if switch-over of the gearing was done only in order to match the load resistance placed by the material on the drill to the drive torque of the motor.

The operating range of the drill is extended if a combination of variable speed motor and shiftable transmission gearing is used in the drill. This drill can then easily be used with drills of different diameters for various types of materials by following suitable tables. From experience, however, it has been found that the proper association of speed and gearing is frequently ignored by operators.

THE INVENTION

It is an object to control the operating speed of a tool bit, for example in a drill or boring machine such that optimum cutting results are obtained under speed and drive torque conditions which are optimally matched to the intended machining results, while considering operating speed of the drive motor, gear transmission ratio and/or cutting bit, e.g. drill or boring tool bit diameter.

Briefly, a contactless transducer is provided having a first part coupled to the jaws of a chuck which holds the tool bit to a drive spindle, and a second part secured to the housing of the tool, e.g. a drill. Movement of the jaws results in relative shifting of position of the first part of the transducer with respect to the second part, and this relative shift is evaluated by signal deriving means coupled to the transducer parts, preferably the stationary parts secured to the housing, to obtain a signal representative of the spacing between the first and second parts, and hence a signal representative of the tool bit diameter.

In accordance with a feature of the invention, the tool includes a gear change mechanism interposed between the motor and the chuck, and a speed transducer is provided which has a first part coupled to the chuck downstream—in the direction of power flow from the motor to the tool bit—of the gear change mechanism, and a second part which is secured to the tool housing. The first and second parts of the jaw diameter or tool bit diameter sensing transducer, and the first and second parts of the speed transducer, can be the same physical elements, the transducer thus providing a mixed output signal which is representative (1) of actual tool bit speed, and (2) of tool bit diameter. The signal derived from the transducer can be analyzed for frequency, thus providing a speed output signal, and for amplitude, to provide a spacing or tool bit diameter output signal. Since the amplitude of an induced signal also varies with speed, the speed portion of amplitude change can be compensated for, so that a signal representative only of spacing between the transducer parts is obtained, that is, a signal which is truly representative of the diameter of the tool bit in the chuck.

The system, thus, is applicable to drills without a gear change mechanism, in which the diameter of the tool bit is to be sensed and utilized as a control parameter, for example for a speed control; the system is also suitable for use with multi-geared drills or boring tools in which the output signal from the transducer is taken off downstream of the gear transmission, so that the actual speed of the tool bit can be matched to a desired speed regardless of the gear position or changing in gearing. Since the control signal derived from the transducer, and representative of tool speed, will be an actual speed signal, the tool bit will operate at the desired speed without jumps in speed upon changing of the gearing in a speed change transmission. If, in addition to the speed signal representative of actual tool speed, it is desired to obtain a signal representative of the size of the drill bit, then this can easily be done by suitable signal processing of the signal derived from the speed transducer.

The control system has the advantage that signal transmission from the chuck to the processing circuitry, which is typically installed on the frame or housing of the tool, is contactless, so that the construction is simple and reliable. Furthermore, simultaneously a speed-dependent signal can be obtained together with the signal for the drill or tool bit diameter so that the transducer, if desired, can have double utility, to function simultaneously as an actual signal transducer for the diameter of the tool bit located in the chuck of the drill, as well as an actual speed transducer for the actual speed at which the drill operates.

The system has the additional advantage that the speed is not sensed from the motor itself but, rather, from the point at which the drill is actually driven so that, if the interposed transmission is a variable speed transmission, a speed controller coupled to the motor will recognize a change in gear transmission—for example commanded by an operator—as a speed deviation or speed error signal, and then control the motor to so operate the drill that the previously commanded speed is maintained. Thus, the spindle which is coupled to the chuck, and which actually drives the tool bit, does not change speed when the gear transmission is changed; rather, the motor driving the gearing will operate faster, or slower, in order to maintain the commanded speed at the tool bit. It is thus possible to properly control the torque applied to a tool bit at a fixed speed. In accordance with the prior art, upon change of speed, a change in torque resulted. This undesirable effect is avoided by the system of the present invention since the transmission gearing can be used exclusively to match the load torque to the motor drive torque, and to determine the speed solely on the basis of required speed of operation, for example as determined from a table. The operation of the drill, or other rotary electric tool, is thus substantially simplified, and speed tables relating different materials, feeds, and drills of varying diameters can be substantially simplified or can be eliminated entirely for many purposes. Operators of even mediocre skill or limited experience can thus carry out assigned drilling, boring or other rotary machining tasks with reproducibly excellent results.

In accordance with a preferred feature of the invention, the signal transducer has an element which is located on a plate secured to the chuck, the plate being engaged with the chuck jaws by a force transmission means, for example a spring. The chuck jaws engage the plate with inclined surfaces. Upon movement of the chuck jaws, the plate is shifted axially along the drive spindle, and thus can change the spacing between the fixed part of the transducer and the plate, which carries the movable part. By suitable shaping of the inclined surfaces, it is possible to obtain a transducer characteristic in accordance with desired transfer relationships. Rather than using inclined surfaces, continuously curved surfaces or stepped surfaces may be used. Stepped surfaces are particularly simple to manufacture; curved surfaces can be used to compensate for non-linearities of the transducer system, or to generate predetermined non-linearities, for example, to preemphasize, or deemphasize certain limiting or intermediate position.

Locating one of the transducer parts on the chuck, that is, on the drive spindle which is downstream of the transmission gearing, is a simple way to obtain transmission output speed. Suitable transducers may be star-wheel transducers or, in accordance with a feature of the invention, a transducer arrangement which can be retained in a closed housing, so that contamination by dirt, cutting chips, and the like, will not interfere with transducer operation. An inductive signal transducer is particularly simple to construct.

A star wheel is a simple structure which provides speed-dependent output signals. Permanent magnets are preferably used in the output signal is to be not only speed-dependent but also contain a signal parameter which can be analyzed to determine the position of the clamping jaws of the chuck. If the signal is to depend only on the clamping jaws of the chuck, a non-magnetic metal ring may be used as the signal transducer. An inductive pick-up is simple and inexpensive, and can easily be attached to the housing, that is, to a fixed location—with respect to the rotating spindle—on the drill. Other magnetic pick-ups, such as magnetic field plates, Hall generators, or the like, may also be used.

In one form, which is suitable to provide both a spacing signal as well as a speed signal, an inductive pick-up is constructed in form of a ring, in which a coil is surrounded by a core formed with projecting pole teeth. The so-constructed fixed signal transducer is positioned to surround the drive shaft or spindle to which the chuck is secured. This arrangement has the advantage of high efficiency of the transducer with excellent protection of the coil against damage or extraneous influences.

A signal which is only representative of spacing of the chuck jaws can be obtained by feeding an alternating voltage into the coil of the transducer, and measuring current flowing through the transducer coil. By current measuring, position of the chuck jaws can be readily obtained. By suitable evaluation or signal analysis circuitry, it is readily possible to also obtain output signals which vary, for example in frequency, as a function of speed, and, additionally, contain a portion which varies as a function of diameter of the tool bit or simultaneously as a function of speed. The control effect to be obtained by the so-evaluated output signal can be selected and switched over by a transfer switch, for example, for comparison of an actual signal with a command signal. The command signal can be additionally connected to control switch-over of a multiple gear change transmission switch and, further, to provide an indication of a selected gear range. It is then possible to obtain, practically automatically, proper operating speed and torque for a wide variety of drilling or boring, or other rotary machining operations, with simple construction of the tool. Gear transmission change can be carried out automatically and, further, indicated. The transducer is then used simultaneously as a control element for gear changing, as well as a controller to correct for operating speeds in accordance with the diameter of a then-installed tool, so that the operator need only select the material in which the tool is to operate, and the proper speed for the tool can then result automatically in the light of the diameter of the tool bit, as sensed by the transducer. Speed adjustment thus is unambiguous, and only a single controller need be operated. There will be no jump in speed at the tool bit even if the gear ratio of the variable speed transmission is changed, since a speed controller will compensate for changes in output speed from the transmission.

DRAWINGS

FIG. 3A is a perspective view of the stationary part of a transducer;

FIG. 3B is a view similar to FIG. 1, and illustrating a modified arrangement of rotary transducer parts;

FIG. 3C is a detail view showing another form of engagement surfaces between the jaw adjustment elements and the rotary transducer part;

FIG. 3D is a detail view showing another form of engagement surfaces between the jaw adjustment elements and the rotary transducer part;

FIG. 4 is a schematic diagram of a control circuit for use with an electric drill;

FIG. 5 is a schematic diagram of another form of a control circuit;

FIG. 6 is a schematic diagram of another embodiment of a control circuit;

DETAILED DESCRIPTION

Figure 1:
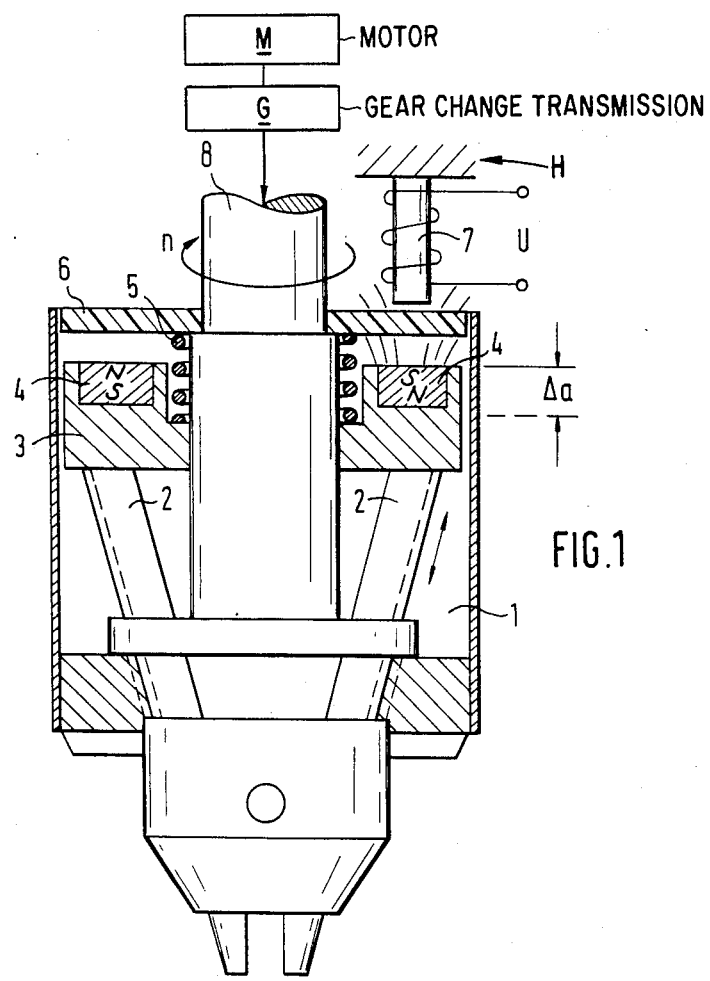
FIG. 1 is a longitudinal section, partly in schematic representation, of a chuck for use with an electric drill, in which a speed transducer is provided which, simultaneously, can provide an output signal of drill bit diameter.

A drive motor M is coupled to a gear change transmission which is manually or automatically controllable, and schematically indicated by block G. The motor as well as the transmission can be of any standard suitable construction customary in the electric drill field, for example in the field of hand-held electric drills. The output from the gear change transmission—that is, downstream of the flow of power from the motor to a tool bit (not shown)—is applied to a drive shaft 8 which is part of a tool chuck 1. The tool chuck 1, which is of essentially conventional construction, has chucking or clamping jaws 2. A plate 3 is secured to the shaft 8, which is driven to rotate by the gear change mechanism G at a speed n. The plate 3 rotates with the shaft 8, for example by being splined thereto, and is pressed against the end surfaces of the chuck jaws 2 by a spring 5 which is seated in a recess of the plate 3. The spring 5 is supported by a counter bearing plate 6, which forms a bottom cover for the chuck 1. Plate 6 may, for example, be of plastic material; if made of metal, it should be of non-magnetic metal. An iron core with a coil 7 wrapped therearound is secured to the housing H of the drill, and shown only in fragmentary representation. The coil 7 is electromagnetically coupled to magnets 4 which are positioned within the ring 3. The magnets 4 may be separate single magnets, or may be in form of a magnetic ring, axially polarized as shown in FIG. 1.

Figure 2:
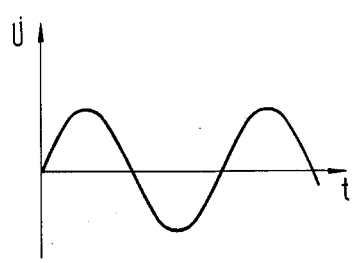
FIG. 2 is a graph of the output signal from the transducer of FIG. 1.

Basic Operation: Upon rotation of spindle 8, and hence of the chuck 1, the inductive transducer formed by the coil 7 and the magnets or the magnet ring 4 will have an alternating voltage induced therein, shown in FIG. 2. The frequency of the voltage is solely dependent on the speed of the chuck 1. The level of the voltage induced in the coil 7, however, is dependent on two parameters, namely speed of the chuck 1, as well the distance of the magnet 4 from the inductive pick-up coil 7. Thus, the amplitude of the voltage contains combined information regarding speed and diameter of a tool bit secured in the chuck jaws 2.

Clamping structures, geared arrangements for tightening of the chuck jaws and the like, and customary on various types of rotary tools, have been omitted from the drawing for clarity. All such arrangements may be of any suitable and well known construction, and the system as described is compatible therewith.

Preferably, the fixed part 7 of the inductive transducer 4/7 is secured to the portion of the housing H close to the chuck, and the drive spindle 8 therefor. FIG. 3A shows a suitable arrangement for the stationary part or portion forming the pick-up of the transducer. The pick-up element is constructed in ring form, having a core 11 in which a coil is inserted. The core 11 has pole teeth 12 at its end facing the axial surface. Such a fixed transducer element has the advantage that the magnetic energy of all the magnets is simultaneously utilized, while additionally being shielded with respect to magnetic spray fields, for example emanating from the drive motor M. Differences in the individual magnets or magnetic zones of a ring magnet 4 will not lead to undulations or stray modulations of the voltage amplitude. The circular core arrangement 11 can readily be located concentrically with respect to shaft 8, and thus can be easily integrated into the next portion of the housing, or secured to the next portion of the housing in the region where shaft 8 projects therefrom.

FIG. 1 illustrates a basic arrangement in which, however, the position of the clamping jaws 2 only poorly influences the output signal. The amplitude of the signal in FIG. 2 increases with increasing speed, or the distance between magnet and pick-up coil 7 decreases. Since the control arrangement reacts in such a manner that the output signal of the pick-up 7 is maintained at an essentially constant level, increasing the opening of the clamping jaws 2 of the chuck will cause, necessarily, an increase in signal amplitude, hence signalling an increase in speed, if speed is measured by signal amplitude. Thus, the opening of the chuck jaws and speed are interrelated as far as the output signal is concerned. The extent or function of interrelation of speed and opening of the chuck jaws, that is, the respective change in speed signal with change in clear diameter or opening of the chuck jaws, is determined not only by a controller associated with the system—to be described below—but also by the mechanical arrangement of the transmission of the change in distance between the plate 3, as controlled by the jaws 2, and the pick-up 7. Optimum matching to controllers for drills and the like is possible only within a limited degree in the arrangement of FIG. 1. The arrangement of FIG. 3B illustrates a preferred form of rotary transducers, which provides for matching of output signal and jaw opening within a much wider range.

Embodiment of FIG. 3B: The chuck 1' has jaws 2' against which a plate 3' can bear, a spring 5' pressing the plate 3' in engagement with the jaws 2'. Magnets or a magnetic ring 4 are fitted within the plate 3'. A cover plate 6, of non-magnetic material, closes off the chuck, as before, through which the drive shaft 8 extends.

In the embodiment of FIG. 3B, the plate 3' is not fitted against the end faces of the jaws 2', but rather against inclined surfaces 9 formed at the inner sides of the jaws 2'. Upon rotating the chuck in order to decrease or increase the spacing between the jaws, the inclined surfaces 9 will slide along similar matched surfaces of the plate 3', forming a distance transmission. For example, upon opening of the jaws, the jaws 2', which will then penetrate deeper within the hollow space of the chuck 1', will press the plate 3' backwardly only so far as the increase in thickness of the jaws 2' requires, due to the inclined surfaces 9. The clamping jaws 2' thus act like unilaterally or singly inclined wedges.

By suitable shaping of the inclined surfaces 9 on the jaws, and similar matching surfaces on the plate 3', the transmission ratio between movement or opening of the jaws 2' and the longitudinal or axial movement of the ring 3' and hence of the magnet 4, can be controlled or selected within a wide range. This arrangement furthermore provides, simply and easily, a system to change the speed or nature of the output signal induced in the stationary part of the transducer—see for example FIG. 3A—in accordance with predetermined transfer functions, and to accurately match the output signal to specific drill types and chucks.

Instead of the inclined surfaces 9, the surfaces on the jaws can be selected to be stepped—see FIG. 3C, or may have a suitably bulged or bowed shape—see FIG. 3D. FIGS. 3C and 3D shows, respectively, in fragmentary and schematic representation, the surfaces 9c, 9d, respectively, of jaws 2'c, 2'd. In selected arrangements, the ratio or transfer function between position of the respective jaws 2', 2'c, 2'd and output signal derived from the stationary pick-up part 7, and hence controlled speed, need not be a straight line or simple function, but can, additionally, be made to be dependent on the particular position of the jaws at any given clear opening or clamping diameter. Thus, non-linearities in the transducer system can be compensated; alternatively, predetermined non-linearities, or preemphasis or deemphasis of respectively assigned positions or portions can be generated.

Control circuitry, with reference to FIG. 4: The chuck 1 or 1' is coupled, as before, through gearing G to motor M, although, for purposes of clarity of the drawing, the gearing and motor have been omitted from the circuit drawings of FIGS. 4–6 and 8. The fixed part 7 of the transducer is secured to the housing of the tool, as illustrated in FIG. 1, for example. The output signal of the inductive transducer is connected to a transfer switch 36. In the position shown, the signal is transmitted by the transfer switch to an evaluation circuit 34 which provides output signals dependent on amplitude. The output signal from amplitude evaluation circuit 34, thus, is a signal which corresponds to the alternating signal applied to the input thereof, either to peak values, or to an average or rms value. The output signal from the evaluation circuit 34 is applied to an actual value input 31 of a control 30 which can be constructed in accordance with any well known electric drill speed control system. The output signal of the controller 30 is connected over an output line 33 to a suitable motor control element, such as a thyristor, or a triac, which controls the energy supply to the motor by controlling the firing angle of an alternating current supply, for example. The terminal of the transfer switch 36 which is shown free in FIG. 4 is connected to an evaluation circuit 35 which evaluates the frequency of the output signal. This output signal likewise is connected to the actual value input of the controller 30. The speed controller 30 receives a command input at a command input terminal 32 which is connected to a switch 37. Switch 37 is preferably ganged with switch 36, as shown schematically by the broken line connecting switches 36 and 37. In the position shown, switch 37 is connected to apply an input signal from a pushbutton or keyboard assembly 40, having keys or pushbuttons A, B, C, D. In the changed-over position, the command input terminal is connected to a continuously adjustable speed controller 41, with which a command speed can be set. Controller 41 may, for example, be a potentiometer.

Operation: Let it be assumed that the switches are in the position shown in FIG. 4. The signal from the stationary part or pick-up 7 is supplied to the amplitude evaluation stage 34. The controller 30 will balance any extraneous or disturbance values which influence the amplitude of the picked up signal. For example, variations in output may be caused by changes in torque, changes in gear transmission, and changes in diameter of the tool bit, if the drill is stopped and a different bit inserted. The direction of control, thus, is such that the controller will increase the input energy to the motor when the voltage at the pick-up 7 drops. This is the case if, for example, counter-torque increases due to tougher material being drilled; a smaller drill is inserted in the chuck; or a transmission ratio is selected which has a greater step-down ratio.

The command input which is applied from the respective keys A–D should correspond to the material being worked on. Thus, the keys A to C may, for example, carry legends regarding different materials, such as wood, steel, non-ferrous metal, masonry or concrete, or the like. It is also possible to add additional characteristics, such as, for example, quality of the cutting tool itself, such as high-speed steel, molybdenum steel, and the like; or presence or accessories.

The speed which, previously, was the primary value which had been used to control the motor of the machine, now becomes a secondary value which is derived from the actual operating conditions thereof. The gear transmission G no longer is the sole element which determines speed; it is only used to change torque, since speed is measured downstream of the gear transmission, looked at in the direction of power flow from the motor M through the transmission G to the drive spindle 8.

The system provides effectively automated operation of the drill. This is particularly important in universal tools which are used not only for drilling in materials to form holes therein, or to ream holes, but especially for such tools which are used for other purposes as well, for example to insert screws, for tapping, or for high-speed operation such as sanding or polishing. For such operations, the speed of the motor must become independent of the position of the jaws 2, 2', respectively, of the chuck 1, 1'. This is obtained by switching over the transfer switch 36 and, to continue to obtain speed control, also the transfer switch 37. Upon transferring switches 36, 37, speed control of the tool will be dependent only on the actual speed of the tool bit, that is, the actual speed of the chuck, without any influence being exerted thereon by the diameter of the tool bit clamped in the chuck 1, 1', respectively. Thus, tools of any desired or available shaft diameter can be used. In this mode of operation, the command value is derived not from the keyboard 40, but rather from a speed controller 41 which may be constructed in accordance with any suitable and well known speed control system, as commercially available. The advantage, however, that the position of the gear change transmission is also part of the control loop is maintained even under this operating mode.

If it is not desired to provide for control based on chuck diameter, then it is possible to eliminate the change-over switch 36, 37 as well as the amplitude evaluation stage 34, and to only utilize a frequency evaluation stage 35 which is simple and well known, to then only determine the speed of operation based on actual output speed of the chuck. The apparatus and devices which are also used to sense the diameter of the tool clamped in the chuck jaws can be eliminated and, for example, a transducer as illustrated in FIG. 1 can be used. If only speed control is needed, the "chuck" can then be any coupling element to transmit rotary power, e.g. a spline coupling, another shaft, or the like. The transducer illustrated in FIG. 3A, however, is preferred since it is compact and immune to stray fields. The further advantage of the system is that this transducer can be utilized without change in the system for dual purpose so that, for example for different model drills, only a single transducer system need be constructed, with the difference in models—speed control only, or torque-bit diameter—speed control combined, requiring only the additional amplitude evaluation stage 34 and, for the embodiment of FIG. 4, the transfer switch 36.

FIG. 5 illustrates a particularly economical embodiment of the control system. The chuck 1, 1' and the pick-up 7 are shown schematically. The output signal from the pick-up 7 is connected to the transfer switch 36 which, again, is arranged to transfer the output to the evaluation stages 34, 35 for amplitude and frequency evaluation, respectively, as in FIG. 1. The outputs of the evaluation circuits are connected to the actual value input of speed controller 30, which applies its output to a suitable semiconductor switch through output line 33.

The command signal is derived differently, namely by a potentiometer 50 which is connected to the command input terminal of the controller 30. The potentiometer 50 has a first scale 51 for speed control, and a second scale 52 representative of materials to be worked on. The scales are covered, respectively, as the transfer switch 35 is changed. For example, in the position shown, the scale 51 is visible so that the particular material is indicated since the amplitude evaluation circuit is connected by the switch 36. Tool bit diameter as well as speed are thus part of the control parameter. Upon change-over of the switch 36, the slider will be moved to the left to then expose only a speed scale. The potentiometer 50 is operated by a hand wheel, shown as a knurled knob.

Figure 8:
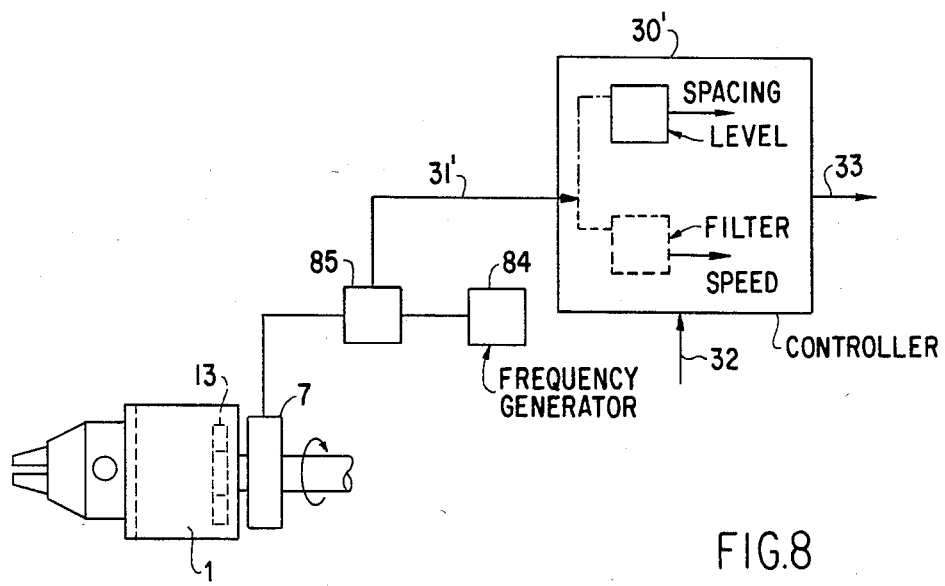
FIG. 8 is a schematic diagram of another embodiment of the control system providing output signals representative only of tool bit diameter.

The transfer switch 30, operating in accordance with FIG. 8, permits saving of a set of contacts. Operation becomes unambiguous since, in one operating mode, it is possible only for an operator to select speed and not materials; in the other operating mode, to only select materials, but not select a given speed. Additional terminals may be provided, with additional windows being controlled, for example by controlling operation of accessories. In a certain position of the slider 53, for example, a setting can be provided for the material "masonry" or "concrete" in which, for example by electromagnetic or mechanical control, a hammering or reciprocating operation of the drill is additionally commanded.

If the model of the drill to which the embodiment of FIG. 5 is to be applied requires only speed control, then switch 36, the amplitude evaluation circuit 34, and the scale 51 can be omitted.

The speed signal of the inductive signal transducer 4/7 permits obtaining a signal which indicates a required or recommended gear transmission setting, for example for a dual gear drill, by providing an output indication, for example by an LED (light emitting diode) indicator, or other suitable output indication element; manual gear change is then recommended; automatic gear change transmission, for example by an electromagnet, may also be commanded—see embodiment of FIG. 6.

Embodiment of FIG. 6: A plurality of transmission gearing stages can be commanded. The chuck 1 is driven by gear transmission 66 from motor 61. The fixed part 7 of the transducer 4/7 is secured to the motor housing as before, and connected to the amplitude-dependent evaluation circuit 34. It is, additionally, connected to the frequency-dependent evaluation circuit 35. A transfer switch 70 is connected between the outputs of the respective evaluation circuits and the actual value or parameter input of the controller 30. The input 32 is connected to receive a command signal. The output of the controller 30 is connected to the gate or control electrodes of a thyristor 71 which is connected serially to the motor in the supply line $L_1$, $L_2$ to the motor. A threshold switch 60 is connected to the output of the frequency-dependent evaluation circuit 35. The outputs of the threshold switch 60 are connected to luminous indicators 62, 63, for example LEDs. Positioning magnet 64 is connected, further, to the output which is also coupled to the LED 62 and a positioning magnet 65 to the output from threshold switch 60 coupled to the LED 63. An EXCLUSIVE-OR gate 68 is connected to a gear positioning terminal 67 within the gear transmission 66. A further input of the EXCLUSIVE-OR gate is connected to that terminal of the threshold switch which is connected to LED 62. The output of the EXCLUSIVE-OR gate 68 is connected with an indicator 69.

The switching threshold of the threshold switch 60 determines the gear change transfer point within the speed operating range of the machine.

Figure 7:
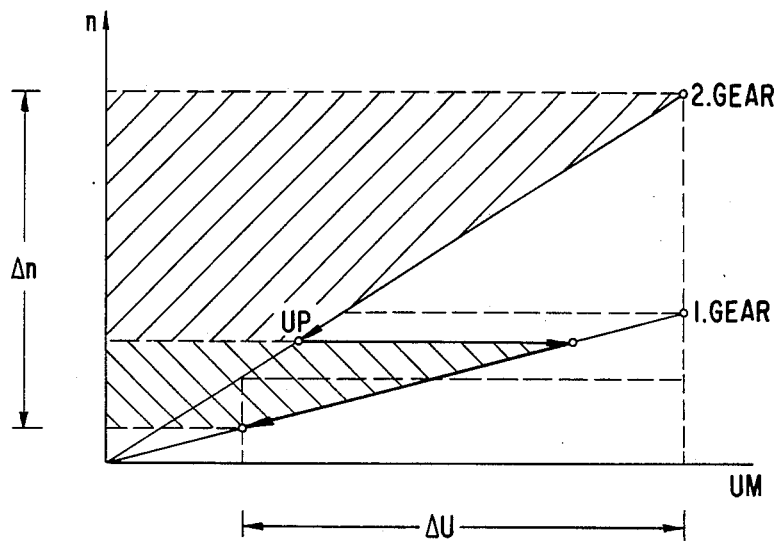
FIG. 7 is a graph of controller adjustment range (abscissa) with respect to motor speed (ordinate) in various gear ranges, and used in connection with explanation of the operation of the system.

Operation, with reference to FIG. 7: The range $\Delta U$ of the controller 30 is indicated to show the respective range within which a corresponding voltage is applied to the motor 61. $\Delta n$ shows the speed range of the machine under idling condition. The switch-over or transfer point UP is determined, essentially, by the transmission ratios of a first gear 1 and a second gear 2 of the transmission 66 and the operating range of the controller 30. Preferably, the transition or switch-over point UP is so selected that it falls approximately in the middle of the overlapping region of the two transmission ranges, which are indicated by broken lines.

Indication of speed change transfer or gear change is independent of the position of the clear opening of the jaws of the chuck, by being biased only on the speed-dependent signals derived from the output of the evaluation circuit 35—see FIG. 6. If the speed drops below a predetermined value, diode 62 will light, indicating that the first gear is to be engaged. If the speed of the transition point is exceeded, diode 63 will light, indicating that the second gear is to be engaged. Positioning magnets 64, 65, not necessary, but desirable, permit automatic electrically controlled gear change or switch-over, by directly controlling gear change within the transmission 66.

The indication is simplified by indicating the desired or command position of the transmission and comparing it with its actual condition. For gear change, switch 67 is then operated which, for example, provides a binary 1-signal at its output when the gear is in first gear, and a binary 0-signal when the gear is in second gear. This signal is checked by the gate 68 with the signal derived from the threshold switch 60 for coincidence. Lamp 69 will light, that is, the output of the gate 68 will be a 1-signal only if there is non-coincidence in the input signals. Thus, indicator 69 provides an indication when the gear transmission is to be changed over. This arrangement has the advantage that the lamp 69 will light only when a change-over is desirable, but no lamp will light when the then engaged transmission is appropriate for the specific operating conditions. For such operation, the diodes 62, 63 can be left off, or concealed. Of course, the combination of the diodes 62, 63, 69 can be used to indicate not only the gear which is engaged but, for exampled by a different colored indicator for indicator 69, that gear change is being or is to be effected.

In certain instances, and for some operations, it is desirable to control operation of the drill based only on diameter of the tool bit. This is particularly important in battery-operated single-geared drills, utilizing shunt-wound or permanent-magnet field motors. The indicating system then must operate independently of speed.

Referring to FIG. 8: The chuck 1 is constructed, for example, as shown in FIG. 1. The magnet ring 4 is replaced by a simple non-magnetized metal ring 13. The transducer 7 can be constructed in any suitable form, for example as illustrated in FIG. 3A. The transducer 7 is fed with an alternating signal by a frequency generator 84. A measuring transducer 85, for example a current transformer or current meter which measures alternating current flow through the coil 7, is connected serially between the frequency generator 4 and the transducer coil 7. The coil of the transducer 7 is inductively loaded by the metal ring 13, which changes the coil current in dependence on the relative distance of the position of the metal ring 13 from the coil 7. Metal ring 13 can be embedded, for example, in the plate 3 (FIG. 1) and shift by the distance Δa.

The measuring transformer or transducer 85 provides an output signal at its output connection 31' as an actual value input to a controller 30'. Controller 30' is so arranged that the motor voltage is decreased when the drill bit diameter increases. The arrangement of FIG. 8 additionally permits measuring information with respect to speed independently of tool bit diameter. To do so, metal ring 13 is formed not as a closed ring, but rather in a group of segments. Loading of the coil will then depend on the angular position of the interrupted ring 13 with respect to the coil. Upon rotation, the coil voltage will have superimposed or modulated thereon a frequency representative of speed, that is, its amplitude is additionaly amplitude-modulated at a frequency representative of speed. The signal which flows through the transducer 85 then will contain information relating to drill diameter, and information relating to speed. The speed information can be separated from the frequency of the frequency generator by a filter, and thus a speed signal independently of position of the jaws can be obtained. Information for the tool bit diameter is included in the amplitude of the output of the frequency generator 84, and information relating to speed in the frequency of the modulation due to the separate segments 13—see FIG. 8. Under the condition—which can be readily realized—that the two frequencies are sufficiently separated from each other, simple filtering permits their separation for separate and independent evaluation, and control of speed and torque of the drive motor M, for example in accordance with predetermined control functions as set into the controller 30, 30', respectively.

Various changes and modifications may be made, and features described in connection with any one of the embodiments may be used with any of the others, within the scope of the inventive concept.

In an exemplary embodiment, a suitable controller 30 or 30' is: TDA 1085A from Motorola. The keys 40 (FIG. 4) are coupled to potentiometers or resistors which control, respectively, appropriate speeds for the materials involved, thus eliminating guesswork on part of an operator. They correspond, then, to respectively different potentiometer settings of potentiometer 50, FIG. 5, to make visible a certain material indication on scale 51.

A suitable signal amplitude evaluation stage (34) is described in PMI 1977/78 Linear and Conversion IC-Products Page 1534 (Precision Rectifies).

A suitable frequency evaluation stage (35) is described in RCH CMOS/MOS Integrated Circuits 1978 Page 164 (PLL).

We claim:
1. Electrical rotary cutting machine having a tool housing (H);
   an electric drive motor (M, 61);
   a motor controller (30);
   a tool bit chuck (1, 1') to receive a shank of a tool bit, and having chuck jaws (2, 2') which can be tightened around the shank of the tool bit,
   and comprising, in accordance with the invention,
   a transducer (4,7) having a first part (4), rotating with and coupled to the jaws (2, 2') of the chuck (1, 1'), but electrically and mechanically unconnected with said housing, and movable upon change in position of the chuck jaws when tool bit shanks of different diameter are being clamped in the chuck,
   and a second part (7) secured to the housing (H),
   movement of the jaws resulting in relative shifting of position of the first part of the transducer with respect to the second part;
   means (3, 5) for moving said first part (4) within said chuck in accordance with movement of said chuck jaws;
   and means (34, 35; 84, 85) electrically coupled to said second part (7) for delivering to said motor controller (30) a signal whose amplitude is representative of the spacing of said first and second parts and whose frequency is representative of the rotation speed of said chuck with respect to said housing.

2. Machine according to claim 1, further comprising a holding plate (3) movably located within the chuck (1, 1'), the first part (4) of the transducer being secured to the holding plate;

and spring means (5) operatively engaging the holding plate and pressing said holding plate against the jaws (2) of the chuck (1).

3. Machine according to claim 1, further including holding means (3) positioned within said chuck, said first part (4) of the transducer being secured to said holding means;

wherein the jaws (2') are formed with inclined or wedge-shaped engagement surfaces (9) and said holding means (3) includes matching engagement surfaces engaging the inclined or wedge-shaped engagement surfaces (9) on the jaws, and being positioned in motion-transmitting relationship thereto;

and means (5) resiliently biassing said inclined or wedge-shaped engagement surfaces and said matching engagement surfaces against each other.

4. Machine according to claim 3, wherein at least one of said engagement surfaces comprises a stepped surface.

5. Machine according to claim 3, wherein at least one of said surfaces comprises a bowed or curved surface.

6. Machine according to claim 1, wherein said first part comprises a holding means (3) positioned within the chuck, and permanent magnet elements located in ring form on said holding means.

7. Machine according to claim 1, wherein said first part comprises a holding means (3) for positioning said first part within the chuck (1), and a non-magnetic electrically conductive ring (13) being secured to said holding means.

8. Machine according to claim 1, wherein said first part comprises a holding means and a ring-shaped element which is electrically discontinuous to form electrically conductive, galvanically isolated conductive segments.

9. Machine according to claim 1, wherein the second part comprises an inductive pick-up.

10. Machine according to claim 9, wherein said inductive pick-up comprises a ring-shaped core (11) being formed with salient pole teeth (12), and a coil winding surrounded by said core.

11. Machine according to claim 1, further comprising a non-magnetic closing plate (6) located at the side of the chuck facing the second part and environmentally separating said first and second parts.

12. Machine according to claim 1, further comprising frequency generating means (84) connected to the second part (7) and supplying said second part with alternating current electrical power.

13. Machine according to claim 1, further including a signal amplitude—responsive evaluation stage (34) connected to receive the output signal of the second part (7) of the transducer;

and a motor speed controller (30) connected to control current flow to the motor (M, 61) and receiving the output from the amplitude evaluation stage as a control input therefor.

14. Machine according to claim 1, further including a frequency evaluation stage (35) connected to receive the output signal from the second part (7) of the transducer;

and a motor speed controller (30) connected to control current flow to the motor (M, 61) and receiving the output from the frequency evaluation stage as a controlled input therefor.

15. Machine according to claim 1, further including signal evaluation means (34, 35, 85) connected to receive the output signals of the second part (7) of the transducer, and evaluating said signals with respect to at least one of the frequency and signal amplitude; and a motor speed controller (30) connected to control current flow to the motor (M, 61) and receiving the output from the signal evaluation means as a control input therefor, and controlling speed of the motor in accordance with at least one of: the frequency and amplitude of the signals applied to the signal evaluation means, as analyzed thereby.

16. Machine according to claim 1, further including command signal input means (40, 41; 50–53) providing command signals representative of at least one of: the motor speed and motor torque;

a motor controller (30) connnected to control current flow through the motor (M, 61) and receiving said command signals, said motor controlled being additionally connected to receive signals from the transducer representative of at least one of: actual operating speed; spacing between the jaws of the chuck; and spacing between the jaws of the chuck at a given speed, and controlling the speed of the motor in accordance with said command signal by controlling current through the motor as a function of comparison of the commanded speed signal and the output signal derived from the transducer.

17. Machine according to claim 16, further including loading indicator-and-selector means (40; 51) connected to provide said command signal to the controller (30);

and selectable switching means (36, 37; 53) selectively switchable for controlling said controller as a function, selectively of one of the
motor speed and the
loading placed on the motor.

18. Machine according to claim 17, further including indicator means coupled to the command signal input means and indicating a characteristic of the command input signal as a function of workpiece material in which said tool bit is intended to operate.

19. Machine according to claim 18, further including indicator means (53) connected to the command signal input means to indicate settings for particular command signals as a function of accessories identified by said indicator means for attachment to said chuck.

20. Machine according to claim 1, wherein said machine is a multi-speed machine including a gear change transmission (G, 66);

and further including control means (62, 63, 64, 65) connected to receive and evaluate a signal representative of speed of the chuck, derived from said second part (7) of the transducer, and effecting control of gear change.

21. Machine according to claim 1, wherein said machine is a multi-speed machine including a gear change transmission (G, 66);

and further including control means (62, 63, 64, 65) connected to receive and evaluate a signal representative of speed of the chuck, derived from said second part (7) of the transducer, and providing indication of gear change.

22. Machine according to claim 1, wherein current supply means (84) are provided, supplying alternating current to said second part (7) of the transducer;

and current flow sensing means (85) are provided connected to the transducer and providing an output signal representative of current flow thereto to provide a signal representative of spacing of the first and second parts of the transducer.

23. Machine according to claim 1, further including an evaluation circuit having a filter connected to receive the output signals from the second part (7) of the transducer, and separating signals therefrom changing as a function of speed of rotation of the chuck and amplitude of the signal into respective speed-dependent and chuck jaw position-dependent signals.

24. Machine according to claim 1, wherein said first part comprises a holding means and a ring-shaped element which is electrically discontinuous to form electrically conductive, galvanically isolated conductive segments;

further comprising frequency generating means (84) connected to the second part (7) and supplying said second part with alternating current electrical power;

current flow sensing means (85) connected to the transducer and providing an output signal representative of current flow thereto to provide a signal representative of spacing of the first and second parts of the transducer;

and further including filter means separating signals representative of passage of said segments of the first part of the transducer past the second part of the transducer and the current being supplied by said frequency generating means to the second part of the transducer to separate signals dependent on amplitude of the current supplied by the frequency generating means, and representative of spacing of said first and second parts of the transducer, and hence of the opening of the chuck jaws from signals representative of speed forming cyclically recurring modulating signals on the signals of the frequency generating means to thereby provide, separately, signals representative of current level, and modulating frequency, and hence of spacing of said jaws and of speed, respectively.

25. Electrical rotary cutting machine, particularly drill or boring tool, having a tool housing (H);

an electric drive motor (M, 61);

a coupling element (1, 1'), selected from the group consisting of: a chuck, a spline coupling, and a shaft, to receive rotary power from the drive motor;

a gear change mechanism (G, 66) interposed between the motor and the coupling element (1);

a speed control circuit (30) connected to control current flow to the motor and to control the speed of said coupling element, and comprising, in accordance with the invention, a speed transducer (4, 7) having a first part (4) coupled to a rotary portion of the machine downstream—in the direction of power flow from the motor to the coupling element—of the gear change mechanism, and a second part (7) secured to the tool housing (H), and means (34, 35; 84, 85) for deriving a signal representative of the speed of said rotary portion, and hence of the coupling element, coupled to said second part (7), and connected to and controlling said speed control circuit (30).

26. Machine according to claim 25, wherein said first part (4) of the transducer is coupled to the output spindle (8) of the machine, downstream—in the direction of power flow from the motor to the coupling element—of the gear change mechanism.

27. Machine according to claim 26, wherein said first part (4) of the transducer is located within the coupling element (1, 1') of the machine.

28. Machine according to claim 25, wherein said transducer comprises an inductive transducer.

29. Machine according to claim 25, wherein said first part (4) of the transducer comprises permanent magnets located in ring-shaped configuration on the coupling element.

30. Machine according to claim 25, wherein the first part (4) of the transducer comprises a non-magnetic metal ring located concentrically with respect to the axis of rotation of the coupling element.

31. Machine according to claim 25, wherein the first part (4) of the transducer comprises a plurality of electrically discontinuous electrically conductive segments located in ring form concentrically with respect to the axis of rotation of the coupling element.

32. Machine according to claim 25, wherein said speed transducer is an inductive pick-up and comprises a ring-shaped core (11) being formed with salient pole teeth (11), and a coil winding surrounded by said core.

33. Machine according to claim 25, further including a frequency evaluation stage (35) connected to receive the output signal from the second part (7) of the transducer;

and a motor speed controller (30) connected to control current flow to the motor (M, 61) and receiving the output from the frequency evaluation stage as a controlled input therefor.

34. Machine according to claim 25, further comprising command signal generating means (40, 41; 50–53) connected to said speed control circuit (30) to provide speed-dependent command signals thereto.

35. Machine according to claim 25, wherein said machine is a multi-speed machine including a gear change transmission (G, 66);

and further including control means (62, 63, 64, 65) connected to receive and evaluate a signal representative of speed of the coupling element, derived from said second part (7) of the transducer, and effecting control of gear change.

36. Machine according to claim 25, wherein said machine is a multi-speed machine including a gear change transmission (G, 66);

and further including control means (62, 63, 64, 65) connected to receive and evaluate a signal representative of speed of the coupling element, derived from said second part (7) of the transducer, and providing indication of gear change.

37. Machine according to claim 25, further including a gear change transmission (G, 61) interposed between the motor, wherein the coupling element is a chuck (1), said chuck (1, 1') is coupled to a drive shaft (8) connected downstream—in the direction of power flow from the motor to the tool bit—of the gear change mechanism (G) to provide speed signals from said transducer representative of actual speed of the tool bit;

and a speed controller (30) is provided, connected to the motor to control speed of the tool bit of the motor in accordance with a command signal, the control signal being responsive to speed signals derived from the second part (7) of the speed transducer, and controlling speed of the tool bit in accordance with said commanded speed independently of the gear transmission setting of the gear change mechanism (G).

* * * * *